(12) United States Patent
Kakani

(10) Patent No.: US 8,606,203 B2
(45) Date of Patent: Dec. 10, 2013

(54) METHODS, APPARATUSES AND COMPUTER PROGRAM PRODUCTS FOR SETTING UP A NETWORK WITH DYNAMIC CHANNEL BANDWIDTH USAGE TO PROVIDE SUPPORT FOR LEGACY DEVICES AND SAVING POWER

(75) Inventor: Naveen Kumar Kakani, Irving, TX (US)

(73) Assignee: Nokia Corporation, Espoo (FI)

( * ) Notice: Subject to any disclaimer, the term of this patent is extended or adjusted under 35 U.S.C. 154(b) by 620 days.

(21) Appl. No.: 12/742,239

(22) PCT Filed: Oct. 27, 2008

(86) PCT No.: PCT/IB2008/002854
§ 371 (c)(1),
(2), (4) Date: May 10, 2010

(87) PCT Pub. No.: WO2009/060275
PCT Pub. Date: May 14, 2009

(65) Prior Publication Data
US 2010/0255800 A1    Oct. 7, 2010

Related U.S. Application Data

(60) Provisional application No. 60/986,877, filed on Nov. 9, 2007.

(51) Int. Cl.
*H04B 1/18* (2006.01)
*H04W 4/00* (2009.01)

(52) U.S. Cl.
USPC ............... 455/166.1; 455/161.1; 455/434

(58) Field of Classification Search
USPC .................. 455/434, 166.1, 161.1
See application file for complete search history.

(56) References Cited

U.S. PATENT DOCUMENTS

2006/0009216 A1   1/2006   Welnick et al.

FOREIGN PATENT DOCUMENTS

EP         0345939 A    12/1989
WO     2006080676 A     8/2006

OTHER PUBLICATIONS

International Search Report and Written Opinion of the International Searching Authority received from PCT Application No. PCT/IB2008/002854, dated May 6, 2009, 11 pages.
Wi-Fi Certified™ 802.11n draft 2.0: Longer-Range, Faster-Throughput, Multimedia-Grade Wi-Fi® Networks, Wi-Fi Alliance (2007) 18 pages.

(Continued)

*Primary Examiner* — Wesley Kim
(74) *Attorney, Agent, or Firm* — Alston & Bird LLP

(57) ABSTRACT

An apparatus, method and computer program product for facilitating one or more stations' (STAs) requests to an access point (AP) to be allowed an exemption regarding scanning of channels in a basic service set and allowing the AP to disallow STAs having visibility of certain channels to be exempt from scanning, although the traffic on a respective channel that the STAs are operating on is below a predetermined threshold, are provided. The apparatus may include a processor configured to receive requests for exemption from scanning adjacent channels to identify devices in a basic service set operating in the channels. The processor may also be configured to determine if a request(s) is received from a device(s) which determines that one of the channels is unavailable for use and when the determination reveals that a channel is unavailable for use, the processor is configured to disallow the device exemption.

20 Claims, 7 Drawing Sheets

(56) References Cited

OTHER PUBLICATIONS

*Draft Standard for Information Technology—Telecommunications and Information Exchange Between Systems—Local and Metropolitan Networks Area Networks—Specific Requirements, Part 11: Wireless LAN Medium Access Control (MAC) and Physical Layer (PHY) Specifications, Amendment 5: Enhancements for Higher Throughput*, IEEE P802.11n/D7.0 (Sep. 2008) 556 pages.
*IEEE P802.11n™/D3.00*, IEEE (Sep. 2007) 544 pages.

| Request for Scanning Exemption 3 | Reserved | Reserved | Reserved | Reserved | Reserved | Reserved | Reserved |

FIG. 4.

| Element ID | Length | Regulatory Class | Channel List |
|---|---|---|---|
| 1 | 1 | 1 | Variable |

Octets:

FIG. 5A.

| Element ID | Length | Regulatory Class | Channel List | Scanning Exempt Request Field 7 |
|---|---|---|---|---|
| 1 Octet | 1 Octet | 1 Octet | Variable | 1 Octet |

FIG. 5B.

METHODS, APPARATUSES AND COMPUTER PROGRAM PRODUCTS FOR SETTING UP A NETWORK WITH DYNAMIC CHANNEL BANDWIDTH USAGE TO PROVIDE SUPPORT FOR LEGACY DEVICES AND SAVING POWER

RELATED APPLICATION

This application is a National Stage Entry of International Application No. PCT/IB2008/002854 filed 27 Oct. 2008, which claims the benefit of priority to U.S. Provisional Patent Application No. 60/986,877 filed 9 Nov. 2007, which is incorporated herein by reference in its entirety.

TECHNICAL FIELD

Embodiments of the present invention relate generally to the provision of dynamic channel bandwidth usage within a network while generally taking into account support for legacy devices and conservation of power.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices. Meanwhile mobile terminals are becoming ubiquitous in the modern world. In this regard, mobile electronic devices of various types that are communicating with other mobile or fixed devices are becoming increasingly common. One area in which there is a demand to increase ease of information transfer relates to networks such as Local Area Networks in which electronic devices such as mobile terminals or stations (STAs) and access points (APs) operate to facilitate the transfer of various forms of traffic data between each other.

Currently, there are various outdated STAs and APs (also referred to herein as legacy devices) in these networks that have been deployed in the marketplace. These STAs and APs may operate with a specified channel bandwidth such as 20 MHz for example. Newer STAs and APs are being developed and deployed which may operate and switch channel bandwidths dynamically. For instance, if an access point has a certain capability, the Basic Service Set can be configured to operate with a channel bandwidth of 20 MHz or 40 MHz or both, that is dynamically switching between the channel bandwidths. However, networks in which devices may dynamically switch between different channel bandwidths may consume more power than is desirable at the devices. Also, devices that are not capable of operating at all the possible channel bandwidths that may be provided by the network may face quality of service (QoS) problems because of devices using dynamic channel bandwidth.

In this regard, the Task Group N (TGn) Draft 3.0 provides that devices that are configured to operate at 40 MHz are required to scan to help the AP in determining the environment and if it is safe to operate as a 40 MHz Basic Service Set. According to the TGn Draft 3.0 stations (STAs) may provide a 20/40 BSS Intolerant Channel Report element that contains a list of channels on which a STA has found conditions that disallow the use of a 20/40 MHz BSS. (As referred to herein a 20/40 MHz BSS is a BSS that has devices such as APs and STAs that may operate in a 20 MHz channel bandwidth or both a 20 MHz and 40 MHz channel bandwidth) According to the TGn Draft 3.0, STAs in the network are exempted from scanning if the STA meets a condition in which the total duration of transmitted Media Access Control (MAC) Service Data Units (MSDUs) and received unicast MSDUs during the previous transmissions does not exceed a threshold referred to as the "Activity Threshold."

However, this exemption potentially creates a situation in which a respective AP does not have enough information about the adjacent channels. For instance, it is the STAs in the network that inform the AP about the status of the BSS on the same channel or an adjacent channel(s) (i.e., allowed channels in the regulatory domain) and if the STAs are exempt from scanning it might result in scenarios where 20/40 BSS operation is affecting STAs that operate in the 20 MHz channel bandwidth in the network because the AP does not have the required information that it needs relating to the status of the BSS. If all the 20/40 MHz STAs in the network are required to scan to help the AP determine the environment of the 20/40 MHz BSS, this scanning drains the battery power of the portable devices in the network such as the STAs and the APs.

Given the above described problems, it may be advantageous to provide a mechanism which does not excessively drain the power of the electronic devices in the Basic Service Set of a network such as a 20/40 MHz BSS while informing APs in the network about the status of the BSS. Additionally, it may be beneficial to provide a mechanism that serves to foster configuration of a BSS having multiple channel bandwidths based on new devices being deployed that may operate in each of the channel bandwidths without affecting existing devices operating on one channel bandwidth that are currently in the marketplace or were previously deployed.

BRIEF SUMMARY

A method, apparatus and computer program product are therefore provided in which a STA requests an AP to be allowed to be exempt from scanning and the AP disallows STAs that have visibility of certain channels to be exempt from scanning although their activity level is low. Exempting all STAs from scanning when their corresponding traffic level is below a certain threshold potentially creates a situation in which an access point may not have enough information about the adjacent channels in the BSS. Since STAs typically have the best view of the adjacent channels resulting from a scan, the exemplary embodiments of the present invention enable respective STAs in the Basic Service Sets to inform a respective AP about the status of the BSS on the same or adjacent channels by disallowing STAs having exclusive visibility of specific channels to be exempt from scanning even when their traffic activity is low. In this manner, the APs of one exemplary embodiment of the present invention are capable of determining if the environment of the BSS is safe to operate in a 20 MHz or 40 MHz or both 20 MHz and 40 MHz bandwidth channels. An AP can choose to force all the STAs in the BSS with specific capability (e.g., 20/40 MHz operation) to scan, such as by indicating in a fixed field in the beacon or dynamically setting the existing fields in the beacon to signal this scan request.

The exemplary embodiments of the present invention also are capable of determining if usage of an AP in one channel bandwidth (e.g., 40 MHz bandwidth channel) would negatively affect (e.g., in terms of Quality of Service (Qos)) the devices operating in another channel bandwidth (e.g., the 20 MHz channel bandwidth). In this manner, the exemplary embodiments of the present invention are capable of configuring a BSS supporting multiple channel bandwidths, e.g., a 20/40 MHz BSS, without affecting legacy devices (e.g., devices operating exclusively on 20 MHz bandwidth channels that were previously deployed) while also conserving power of the devices in the Basic Service Set by efficiently requiring only certain STAs to perform scans.

In one exemplary embodiment, a method and computer program product are provided for determining whether one or more devices in a basic service set (BSS) are exempt from scanning. The method and computer program product may include receiving one or more requests to be exempt from scanning one or more adjacent channels to identify one or more devices in a basic service set that may operate in at least one of the channels. The method and computer program product may also include determining when at least one of the requests is received from at least one device which determines that at least one of the channels is unavailable for use. When the determination reveals that the channel(s) is unavailable for use, the method and computer program product may also disallow the device exemption from performing the scanning.

In another exemplary embodiment an apparatus for determining whether one or more devices in a basic service set are exempt from scanning is provided. The apparatus may include a processor configured to receive one or more requests to be exempt from scanning one or more adjacent channels to identify one or more devices in a basis service set operating in at least one of the channels. The processor may also be configured to determine when at least one of the requests is received from at least one device which determines that one of the channels is unavailable for use. When the determination reveals that at least one of the channels is available for use, the processor may be configured to disallow the device exemption from performing the scanning.

In yet another exemplary embodiment an apparatus for determining whether one or more devices in a basic service set are exempt from scanning is provided. The apparatus includes a means for receiving one or more requests to be exempt from scanning an adjacent channel(s) to identify one or devices in a basic service set (BSS) operating in the channel(s). The apparatus also includes a means for determining if at least one of the requests is received from a device(s) which determines that one of the channels is unavailable for use. When the determination reveals that one channel is unavailable for use, the apparatus disallows the device(s) exemption from performing the scanning.

Embodiments of the invention facilitate one or more STAs requests to an AP to be allowed an exemption regarding scanning of channels in a basic service set and allows the AP to disallow STAs that have visibility of certain channels from being exempt from scanning even though the traffic or activity in a respective channel that the STAs may be operating in is below a predetermined threshold.

BRIEF DESCRIPTION OF THE SEVERAL VIEWS OF THE DRAWINGS

Figure 1:
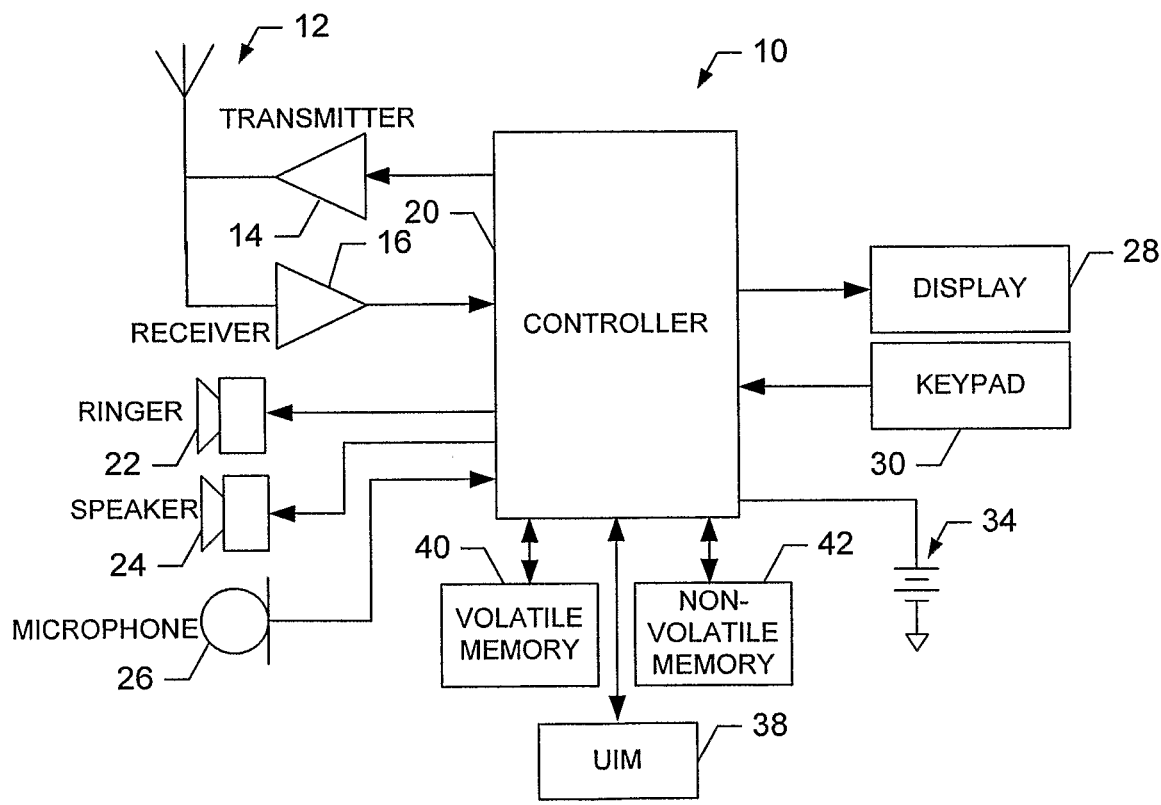
Figure 2:
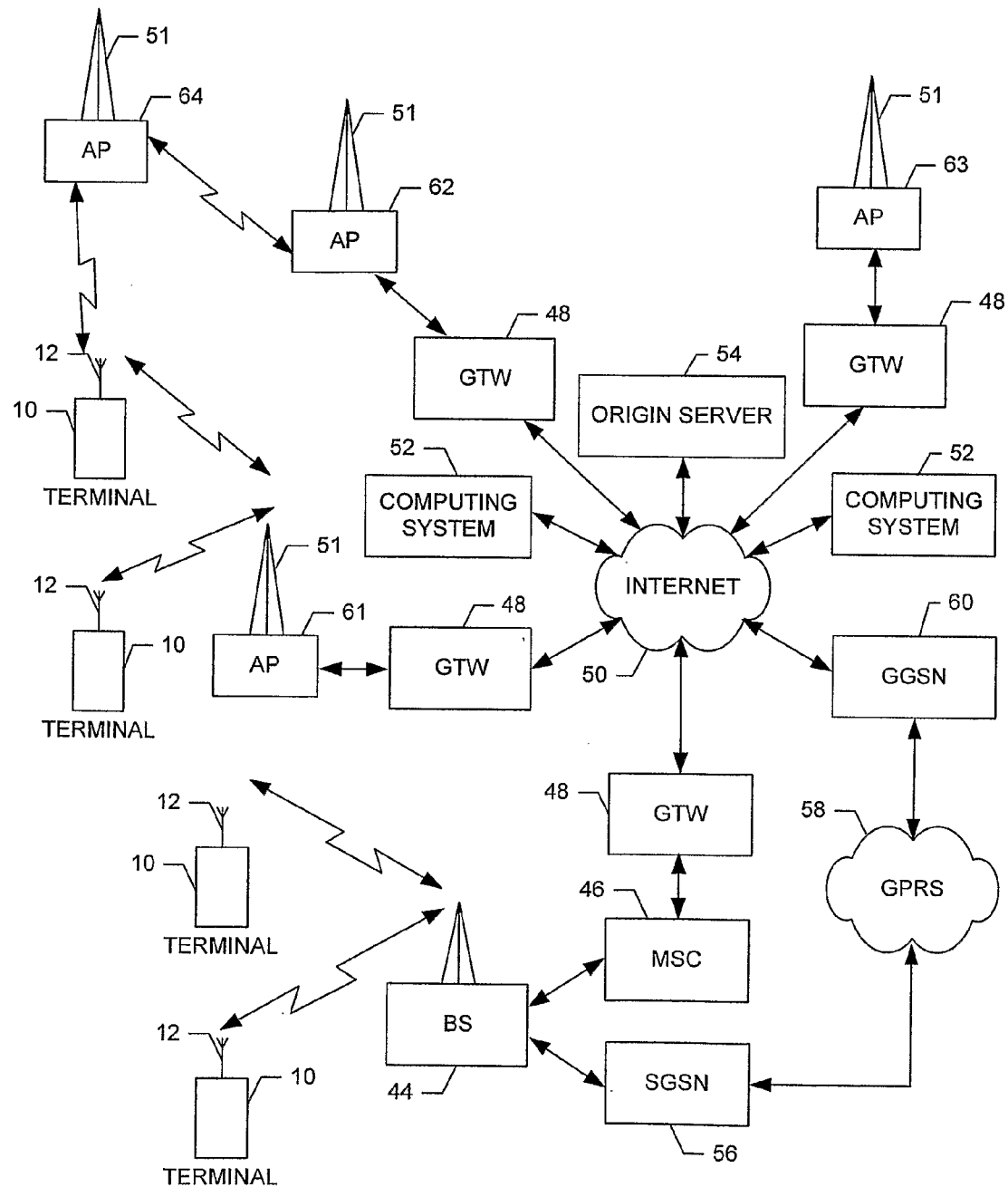
Figure 6B:
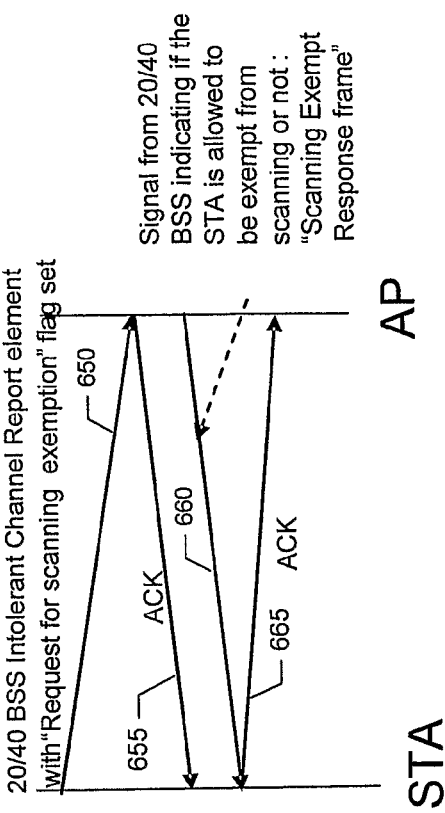
Figure 6A:
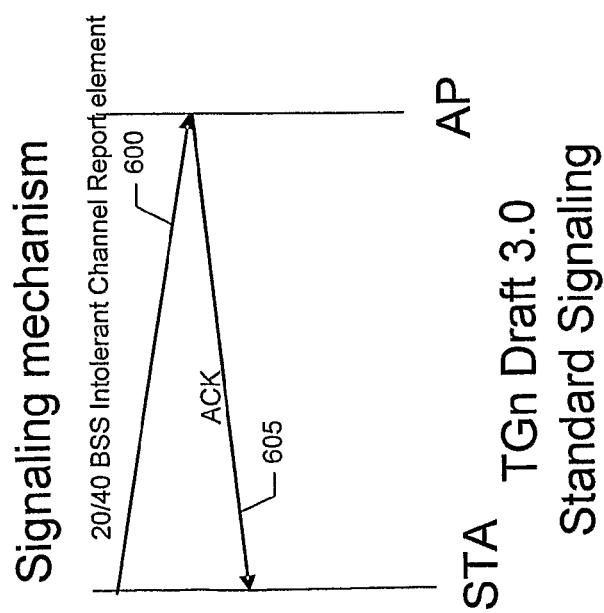
Figure 7:
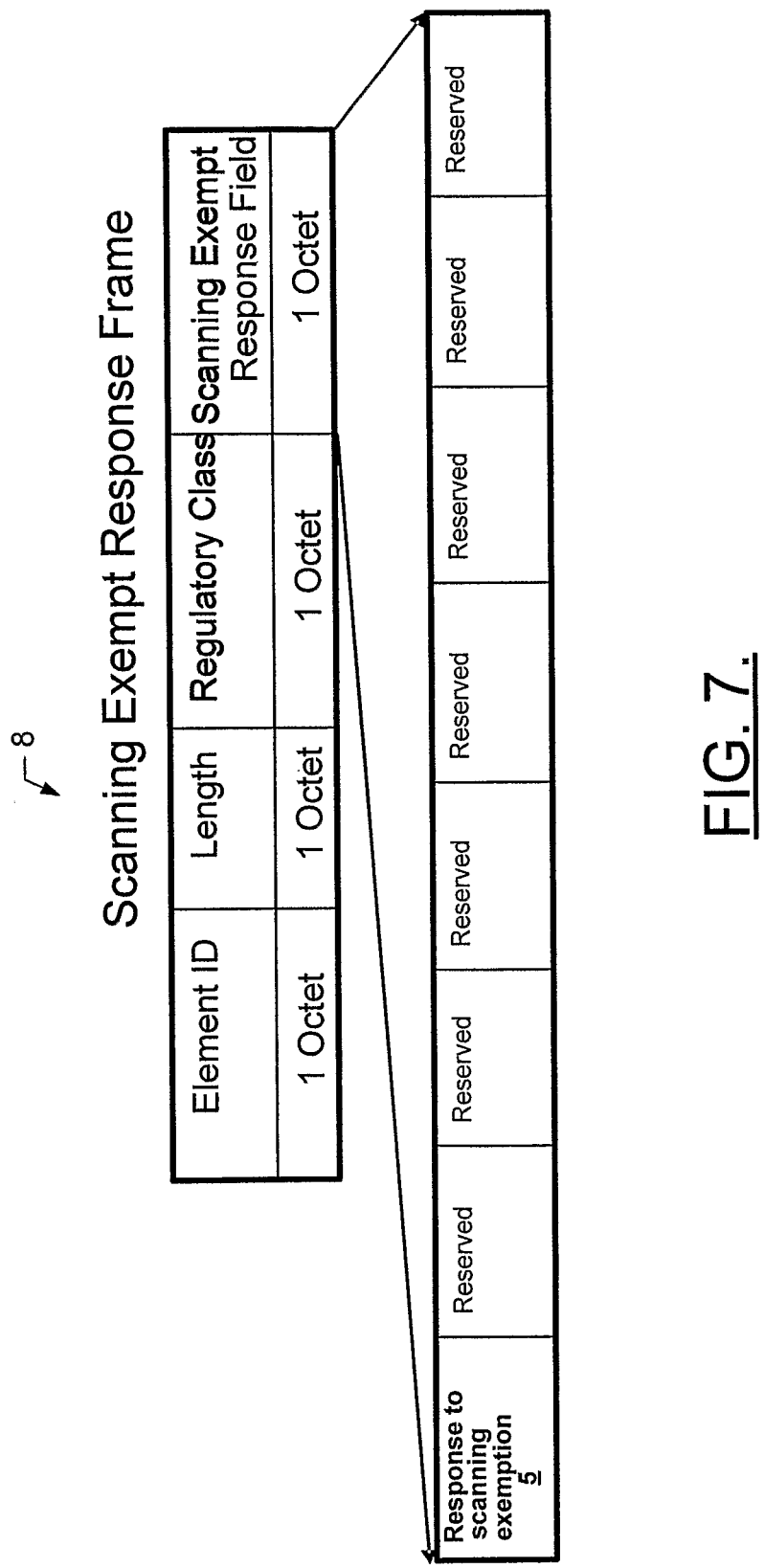
Figure 8:
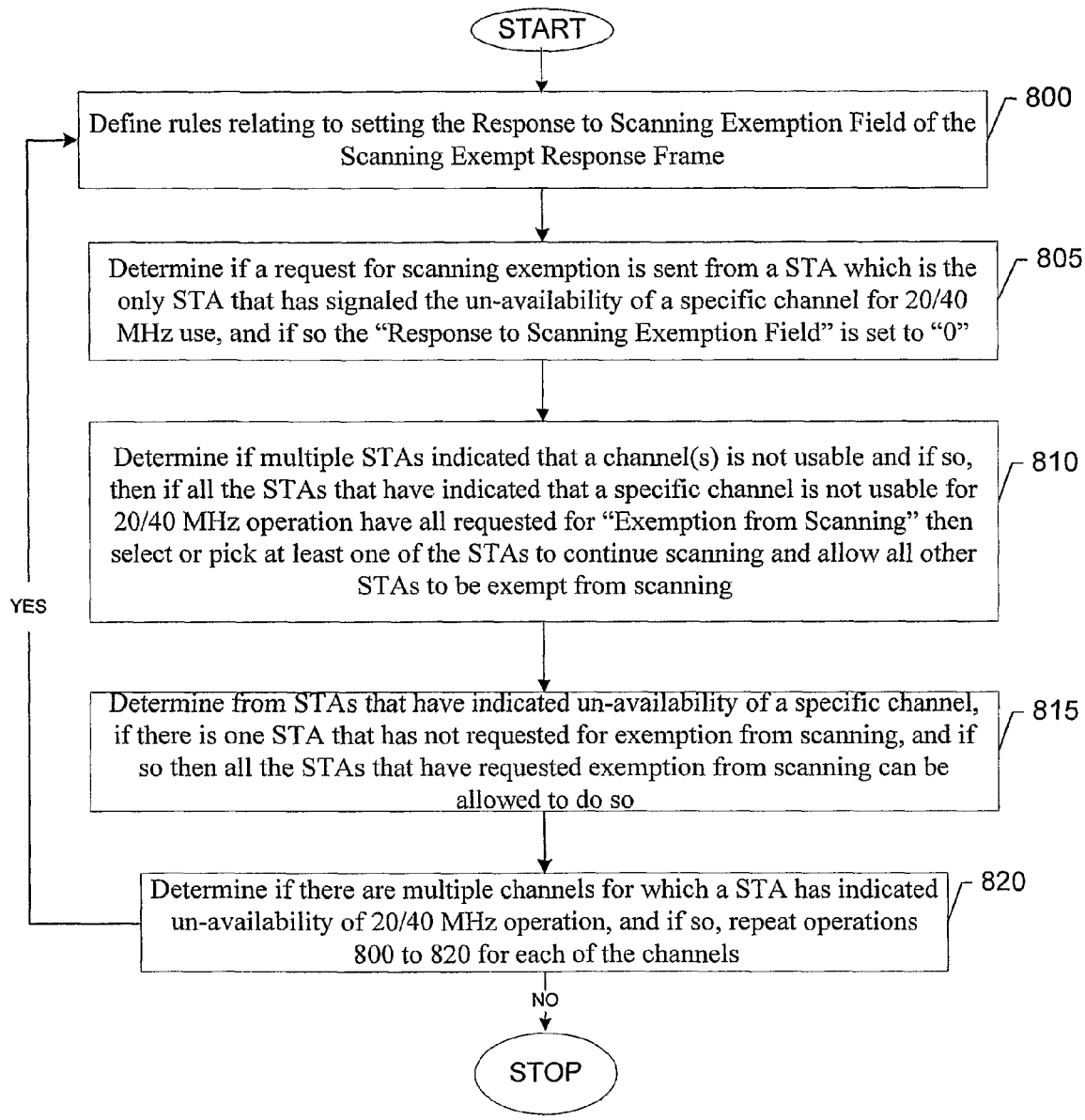

Having thus described the invention in general terms, reference will now be made to the accompanying drawings, which are not necessarily drawn to scale, and wherein:

FIG. 1 is a schematic block diagram of a mobile terminal according to an exemplary embodiment of the present invention;

FIG. 2 is a schematic block diagram of a wireless communications system according to an exemplary embodiment of the present invention;

FIGS. 3A, 3B, 3C and 3D are systems of Basic Service Sets supporting devices operating in a 20 MHz channel bandwidth, a 40 MHz channel bandwidth as well as both the 20 MHz and the 40 MHz channel bandwidths according to an exemplary embodiment of the invention;

FIG. 4, is a diagram of a Scanning Exempt Request Field of a 20/40 BSS Intolerant Channel Report element utilized with a protocol for requesting exemption of scanning according to an exemplary embodiment of the invention;

FIG. 5A is a diagram illustrating the format of a 20/40 BSS Intolerant Channel Report element 9 relating to TGn Draft 3.0 according to an exemplary embodiment of the invention;

FIG. 5B is a diagram illustrating the format of a 20/40 BSS Intolerant Channel Report element 11 which also contains a Scanning Exempt Request Field according to an exemplary embodiment of the invention;

FIG. 6A is a signaling diagram according to the TGn Draft 3.0 standard according to an exemplary embodiment of the invention;

FIG. 6B is a signaling diagram relating to the sending of a 20/40 BSS Intolerant Channel Report element with Request for scanning exemption sent from a STA(s) to an AP according to an exemplary embodiment of the present invention;

FIG. 7 is a diagram of a Scanning Exempt Response frame sent by a AP to a STA according to an exemplary embodiment of the present invention; and FIG. 8 is a flowchart relating to one or more rules for setting the Response to Scanning Exemption Field of the Scanning Exempt Response Frame 8 according to an exemplary embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from the present invention and, therefore, should not be taken to limit the scope of the present invention. While several embodiments of the mobile terminal 10 are illustrated and will be hereinafter described for purposes of example, other types of mobile terminals, such as portable digital assistants (PDAs), pagers, mobile televisions, laptop computers and other types of voice and text communications systems, can readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries. For example, network devices as shown in FIG. 2 and described below, or indeed, any electronic device involving hardware and software elements would similarly benefit from embodiments of the present invention. Accordingly, the present invention should not be construed as being limited to applications in the mobile communications industry.

The mobile terminal 10 may include an antenna 12 (also referred to herein as transceiver or radio transceiver) in operable communication with a transmitter 14 and a receiver 16. The mobile terminal 10 may further include a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols such as IS-136, Time Division Multiple Access (TDMA), Global System for Mobile Communications (GSM), and IS-95 as well as Code Division Multiple Access (CDMA) or third-generation (3G) wireless communication protocol Wideband Code Division Multiple Access (WCDMA).

The mobile terminal 10 may operate in a variety of over-the-air modulation techniques that use radio frequency (RF), Bluetooth (BT), infrared (IrDA) or any of a number of different wireless networking techniques, including Wi-Fi, wireless LAN (WLAN) techniques such as IEEE 802.11 (e.g., 802.11a, 802.11b, 802.11g, 802.11n, etc.), Worldwide Interoperability for Microwave Access (WiMAX) techniques such as IEEE 802.16, and/or ultra wideband (UWB) techniques such as IEEE 802.15 or the like. Additionally, the mobile terminal 10 may be capable of operating as a station (STA) and/or a wireless access point (AP) in a Basic Service Set. In this regard, the mobile terminal may be capable of operating with a channel bandwidth of 20 MHz or 40 MHz or any other suitable bandwidth. In this regard, the mobile terminal 10 of one embodiment may be capable of dynamically switching between the 20 MHz channel bandwidth and the 40 MHz bandwidth. Additionally or alternatively, the mobile terminal of one embodiment may be capable of operating in both 20 MHz and 40 MHz channel bandwidths BSS.

It is understood that the controller 20 may include circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 may be allocated between these devices according to their respective capabilities. The controller 20 thus may also include the functionality to convolutionally encode and interleave message and data prior to modulation and transmission. The controller 20 can additionally include an internal voice coder, and may include an internal data modem. The controller 20 may be capable of facilitating the transmission of beacons to other STAs or APs, for example via antenna 12 as well as detecting beacons that are sent from other STAs, APs or the like. The controller 20 may be also capable of facilitating scanning of a BSS and informing an AP(s) about the status of a BSS on the same channel or an adjacent channel(s) (e.g., allowed channels in the regulatory domain). These scans of the STAs also assist an AP in determining whether the BSS environment of one embodiment is safe to operate in a 20/40 MHz BSS. A STA and/or an AP may perform a scan either dynamically or passively. Before performing a scan on a specific channel, the STA or the AP first switches their radio to the channel. In a dynamic scan the STA or AP transmits a broadcast frame to which the APs operating in that channel respond back indicating their capability. In a passive scan the AP or STA monitors the traffic and/or beacon(s) in that channel to determine the presence of devices operating in that channel and their capability. The APs 61, 62, 63 and 64 typically include the capability to detect other devices such as other APs and STAs on an adjacent channel and determine the channel bandwidth that these devices are operating within. (See FIG. 2)

Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. The mobile terminal 10 may further include a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Referring now to FIG. 2, an illustration of one type of system that would benefit from embodiments of the present invention is provided. The system may include a plurality of network devices, any of which may employ embodiments of the present invention. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 may be capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a Wireless Local Area Network (WLAN), a Wi-Fi network, an 802.11 network, a metropolitan area network (MAN), and/or a wide area network (WAN). The MSC 46 can be directly coupled to the data network. In one typical embodiment, however, the MSC 46 may be coupled to a gateway (GTW) 48, and the GTW 48 may be coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. The SGSN 56 may be capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 may be coupled to a packet-switched core network, such as a GPRS core network 58. The packet-switched core network may then be coupled to another GTW 48, such as a GTW GPRS support node (GGSN) 60, and the GGSN 60 may be coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as Multimedia Messaging Service (MMS) messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G, third-generation (3G) and/or future mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as Total Access Communication System (TACS) network(s) may also benefit from embodiments of the present invention, as should dual or higher mode mobile stations (e.g., digital/analog or TDMA/CDMA/analog phones).

As described above, the mobile terminals 10 may be capable of operating as a stations (STAs) and/or wireless access points (APs). Additionally, or alternatively, the mobile terminals 10 can further be coupled to one or more wireless access points (APs) 61, 62, 63, 64. While four wireless access points are shown in the system of FIG. 2 it should be pointed out that any suitable number of APs may be part of the system without departing from the spirit and scope of the invention. The APs 61, 62, 63, and 64 may have a transceiver 51 (also referred to herein as radio transceiver) that is capable of transmitting data to other APs and STAs 10 as well as receive data from other APs as well as STAs. Each of the APs 61, 62, 63 and 64 typically contains a processor or the like capable of executing instructions for performance of embodiments of the present invention. For example, the processor may be embodied as one or more of a coprocessor, a controller or various other processing means or devices including integrated circuits such as for example, an ASIC (application specific integrated circuit). In this regard, the processor of the APs 61, 62, 63, and 64 may be capable of facilitating receipt of data, such as for example messages from other APs as well as STAs and for facilitating transmission of data to other APs and STAs or the like. For instance, the APs 61, 62, 63 and 64 may be capable of detecting beacons sent from STAs, other APs or the like. The APs 61, 62, 63 and 64 may include the capability to detect other devices such as other APs and STAs on adjacent channels and determine the channel bandwidth that these devices are operating within.

The APs 61, 62, 63, and 64 may comprise access points configured to communicate with the mobile terminal 10 in accordance with techniques such as, for example, radio frequency (RF), Bluetooth (BT), infrared (IrDA) or any of a number of different wireless networking techniques, including Wi-Fi, wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 61, 62, 63, and 64 may be coupled to the Internet 50. Like with the MSC 46, the APs 61, 62, 63, and 64 can be directly coupled to the Internet 50. In one embodiment, however, the APs 61, 62, 63, and 64 are indirectly coupled to the Internet 50 via a GTW 48. Furthermore, in one embodiment, the BS 44 may be considered as another AP 61, 62, 63, and 64. The AP 61 may be capable of operating with a channel bandwidth of 20 MHz as well as any other suitable channel bandwidth. On the other hand, the AP 62 may be capable of operating with a channel bandwidth of 40 MHz as well as any other suitable channel bandwidth and the AP 63 may be capable of operating with a channel bandwidth of both 20 MHz and 40 MHz as well as any other suitable channel bandwidths. In this regard, the AP 63 may dynamically switch between the 20 MHz channel bandwidth and the 40 MHz channel bandwidth. The AP 64 is typically capable of operating with a channel bandwidth of both 20 MHz and 40 MHz as well as any other suitable channel bandwidths and may dynamically switch between the 20 MHz channel bandwidth and the 40 MHz channel bandwidth. Additionally, an AP such as, for example, the AP 64 is capable of receiving a request from a STA(s) to be allowed to be exempt from scanning and the AP 64 is capable of responding back to the request sent from the STA (s). The request sent from the STA(s) to the AP (e.g., AP 64) may consist of a report. In an exemplary embodiment, the report such as a 20/40 BSS Intolerant Channel Report element 11 can contain a Scanning Exempt Request Field 7 that is sent from one or more STAs. The Scanning Exempt Request Field 7 may contain data such as for example, a bit specifying whether a respective STA 10 is requesting exemption from scanning as discussed more fully below. Additionally, the AP 64 of one embodiment may be capable of sending one or more STAs, which sent the AP 64 a 20/40 BSS Intolerant Channel Report element 11 having the Scanning Exempt Request Field 7, a Scanning Exempt Response Frame 8 which includes various fields in which one of these fields is a Scanning Exempt Response Field. (See FIG. 7) The Scanning Exempt Response Field of the Scanning Exempt Response Frame 8 may include data such as one or more bits indicating whether a STA(s) is allowed to be exempt from scanning or not, as discussed more fully below. (See FIG. 5A) The APs 61, 62, 63 and 64 as well as the STAs 10 may form one or more Basic Service Sets. One or more APs may act as a master (e.g., AP 64) to control the STAs with a particular BSS. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Figure 3:
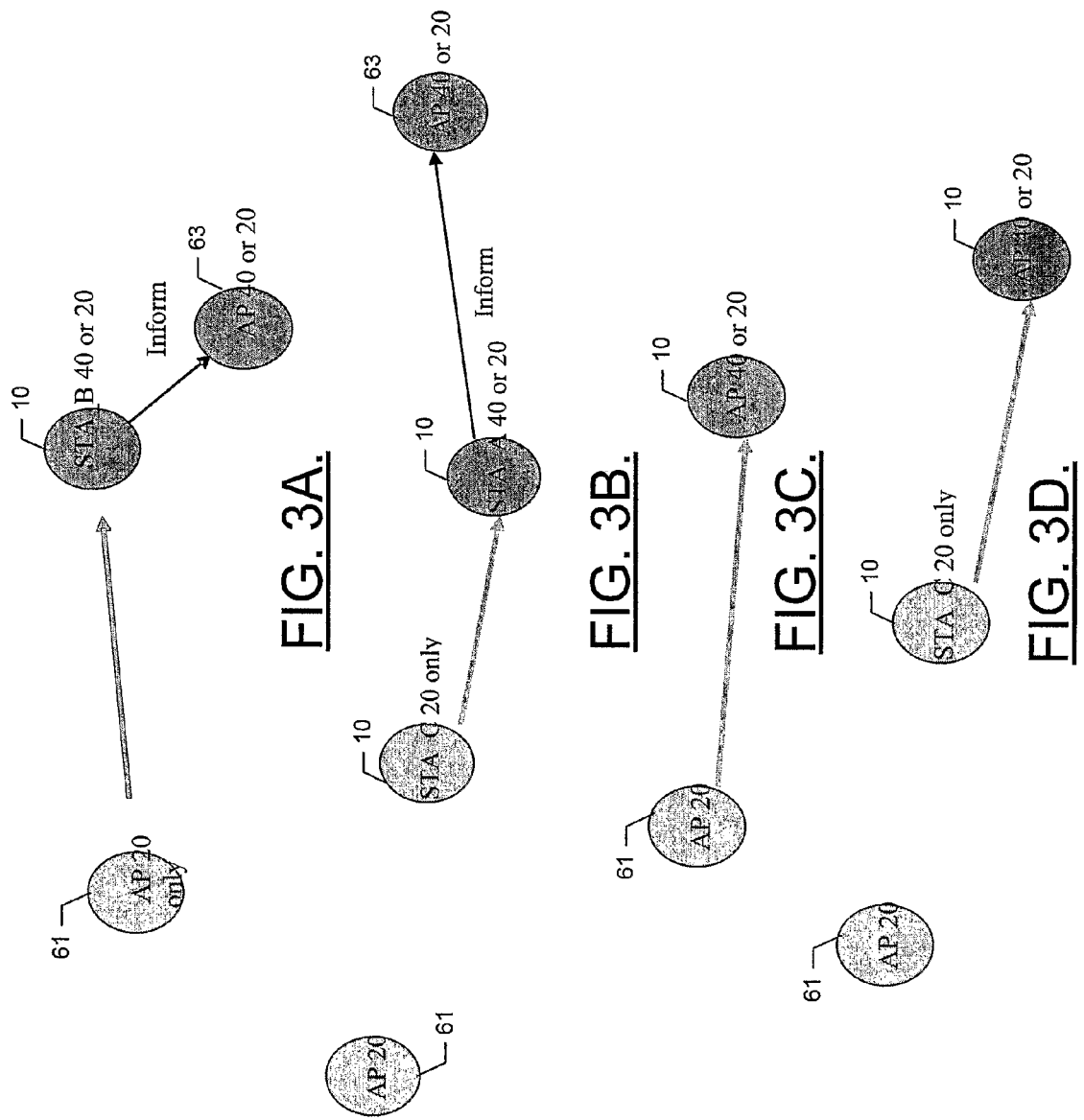

An exemplary embodiment of the invention will now be described with reference to FIG. 3, in which certain elements of a system for decoupling hardware settings from software are displayed. The system of FIG. 3 may be employed, for example, on the mobile terminal 10 of FIG. 1 or the network devices of FIG. 2. However, it should be noted that the system of FIG. 3, may also be employed on a variety of other devices, both mobile and fixed, and therefore, embodiments of the present invention should not be limited to application on devices such as the mobile terminal(s) 10 of FIGS. 1 and 2 or the network devices of FIG. 2.

Referring now to FIGS. 3A, 3B, 3C and 3D, systems of Basic Service Sets supporting devices operating in a 20 MHz channel bandwidth, a 40 MHz channel bandwidth as well as both the 20 MHz and the 40 MHz channel bandwidths are provided. The system and BSS of FIG. 3A includes AP 61, STA 10 and AP 63. As discussed above, TGn Draft 3.0 provides a mechanism by which a BSS can be configured to be capable of operating in a 40 MHz mode. According to TGn Draft 3.0, if the AP is capable of operating in the 40 MHz mode then it will do so only if the following condition is true. Namely, that there is no indication from STAs that are capable of operating in a 40 MHz bandwidth in a corresponding BSS specifying that as a result of the STAs scanning that there are APs configured in adjacent channels (i.e., adjacent to the channel on which the AP of the respective STA(s) is operating) that are capable of operating with a channel bandwidth of 20 MHz only. In FIG. 3A, STA 10 (which also may function as an AP) may detect a beacon from an AP such as for example AP 61 operating in a 20 MHz channel bandwidth on an adjacent channel and the AP 61 may inform its AP (i.e., AP 10) about the presence of the AP 61 in the adjacent channel. The beacon may consist of data such as signals sent from the AP 61, which advertises its presence to the STA 10. Since AP 61 is operating on an adjacent channel in a 20 MHz channel bandwidth only, the AP 10 must operate in the 20 MHz bandwidth as opposed to the 40 MHz bandwidth to comply with TGn Draft 3.0, even though the AP 10 of one embodiment is capable of operating in both the 40 MHz and 20 MHz channel bandwidths.

As shown in FIG. 3B, the system and BSS therein includes AP 61, STA 10 operating in a 20 MHz channel bandwidth, a STA 10 operating in a 20 MHz and/or 40 MHz channel bandwidth(s), and AP 63. STA 10 (also referred to herein as STA A) may detect traffic on the adjacent channel to/from another STA 10 (also referred to herein as STA C) operating in a 20 MHz channel bandwidth and STA A may inform its AP 63 about the presence of STA C operating in the 20 MHz channel bandwidth in an adjacent channel. In this regard, the AP 63 must operate in the 20 MHz channel bandwidth since STA C is operating in an adjacent channel in the 20 MHz channel bandwidth when complying with TGn Draft 3.0.

Referring now to FIG. 3C, the system and BSS therein includes AP 61 and AP 10. In this regard, it should be pointed out that the AP, such as AP 10, before deciding to configure its network to operate in 40 MHz mode might also scan to see if there are any APs such as for example AP 61 on the adjacent channels that are not capable of operating in 40 MHz mode. Since AP 10 detects the beacon (e.g., indicated by the arrows in FIGS. 3A-3D) from AP 61 indicating that AP 61 is on an adjacent channel operating in the 20 MHz channel bandwidth only, the AP 10 may not operate in the 40 MHz channel bandwidth when complying with TGn Draft 3.0.

As shown in FIG. 3D, the system and BSS disclosed therein includes an AP 61, STA 10 and AP 10. The AP 10 may detect traffic on the adjacent channel from STA 10 which operates in the 20 MHz channel bandwidth. In this regard, the AP 10 would not operate in the 40 MHz channel bandwidth when complying with TGn Draft 3.0. One possible reason why the AP 10 of one embodiment would not configure the BSS to operate in this situation, is because if it switches to 40 MHz mode then it needs to subsequently use the 20 MHz (along with its current 20 MHz channel) of the adjacent channel on which there is already traffic (e.g., another AP is using that 20 MHz channel) that would create a problem for the STAs that are using the adjacent BSS in terms of QoS and power consumption, for example. Given the coverage areas of the AP and the STAs (can be at the border of the coverage area of its AP and its adjacent AP) in the BSS, the AP may not be able to detect all situations of overlap (relative to channel usage). However, detection of "Marginal overlap" by the AP may be beneficial. This is because there might not be many STAs in the overlap area right now but potentially there is a possibility to have many STAs in the overlap area because of the mobility of current STAs and/or new STAs using the BSS. If an AP is the device that is performing the scanning then it may not be able to support any data exchange between the STAs in the BSS until the scanning operation is done (because the transceiver of the AP is switched to the new channel). STA participation may be required and therefore the detection of devices on adjacent channels may be performed by STAs as opposed to the AP.

It should be pointed out that the scan operation referred to above would typically require the STA or AP to actually switch their respective transceivers (e.g., radio transceivers) to the particular channel and perform an active scan, i.e., sending a request (e.g., broadcast) asking if any device is actually using the channel (in a WLAN this message is referred to as "Probe request"). In response to the message, if there is an AP using the channel, this AP can respond back (via a Probe response, for example) to signal that it is using the channel along with its capabilities (e.g., indicating it can operate only in 20 MHz mode and it cannot support 40 MHz mode or it is a legacy device). It should also be pointed out that the scan operation might require the STA or the AP to actually switch their transceiver (e.g., radio transceiver) to the respective channel and perform a passive scan which monitors for any traffic on the channel and possibly for the beacon transmission of the AP (which advertises its capabilities). Since the AP is supporting the traffic to the STAs in its network it is typically not possible for an AP to switch its transceiver to another channel. That is to say, it is typically not possible for the AP to stop servicing STAs that are associated with it and perform the scanning itself. Instead, the AP may rely on the information it gets from a STA(s) to decide whether to configure to 40 MHz mode (i.e., the 40 MHz channel bandwidth) or not. The current TGn Draft 3.0 does not require an AP to perform a scan.

TGn Draft 3.0 proposes that a STA that is 40 MHz capable can be exempt from scanning if the amount of traffic that is directed to/from the STA is below a threshold. The TGn Draft 3.0 standard provides a Minimum, a Maximum and a default Value of the threshold (e.g., ACTIVITY_THRESHOLD).

However, this exemption potentially creates a situation where the AP may not have enough information about the adjacent channels since the APs receive information about the BSS from the STAs during their scan. As discussed above, STAs typically have the best chance of obtaining information on the adjacent channels and it might be that the AP when using the 40 MHz mode is actually affecting the traffic of adjacent AP's. For instance, if the adjacent network only supports a 20 MHz channel bandwidth, then these devices on the 20 MHz channel bandwidth cannot understand the traffic coming from the overlapping 40 MHz transmission and their QoS is affected negatively. Some of these devices operating on the 20 MHz channel bandwidth can be legacy devices (e.g., 802.11b and 802.11g devices) that were previously deployed in the system or network.

It should be pointed out that it is possible for a respective AP to lower the value of its current ACTIVITY_THRESHOLD and force many STAs to perform scans, if there is any (minimal) traffic for the STAs. However, this approach may result in 40 MHz STAs that are battery limited by draining out their battery power faster. However, if the STAs that are actually able to see the overlapping channel (e.g., because of their position/location in the network) are not carrying any traffic then they are still exempt from scanning and there is nothing that provides the AP information related to the overlap, which is desired. A STA can see traffic on an adjacent channel(s) and it is controlled by another AP.

The exemplary embodiments of the present invention may overcome this situation because if a STA in the network as a result of its scanning is able to provide an AP with information on a channel about which the AP does not currently have any information, then that STA of one embodiment is not allowed to be exempt from scanning even though the activity level (i.e., amount of traffic to/from the STA) is below the threshold ACTIVITY_THRESHOLD. In other words, STAs 10 that are associated with the AP as 20/40 MHz devices, at the time after association are required to scan. As a result of scanning, if the STA transmits a "20/40 BSS Intolerant Channel Report" element, then the following conditions apply.

For example, if there is only one STA 10 that has reported that the conditions on a specific channel are not suitable for 20/40 MHz BSS operation, then that STA 10 is not exempt from scanning even though the activity is below a predefined threshold. Alternatively, if there are multiple STAs 10 that have reported that a channel is unusable then the STA 10 can be signaled regarding whether it is allowed to be exempt from scanning or not according to the protocol discussed below with respect to FIG. 4.

Referring now to FIG. 4, a protocol for requesting exemption of scanning by using a Scanning Exempt Request Field 7 according to an exemplary embodiment of the invention is provided. To be precise, the Scanning Exempt Request Field of one exemplary embodiment may be included in the "20/40 BSS Intolerant Channel Report element" so that a STA 10 may signal if it chooses to be exempt from scanning. The Scanning Exempt Request Field that may be included in the "20/40 BSS Intolerant Channel Report element" of the exemplary embodiments may contain a one byte field, namely, the "Request for scanning exemption" Field 8. STAs 10 that wish to be allowed to be exempt from scanning may set the "Request for scanning exemption" field bit to "1", otherwise the bit may be set to "0" indicating that there is no request for exemption from scanning. The STA 10 may need to wait for the AP to respond back with a frame signaling indicating if the STA is allowed to be exempt from scanning or not.

As an example, FIG. 5A is a diagram illustrating the format of a 20/40 BSS Intolerant Channel Report element 9 according to TGn Draft 3.0. As shown in FIG. 5A, the 20/40 BSS Intolerant Channel Report element 9 includes an Element ID containing one octet, and a Length field that is variable and depends on the number of channels reported in the Channel List. The Element ID indicates that this is the "20/40 BSS Intolerant Channel Report" Element. The minimum value of the length field is 1, based on a minimum length for the channel list field of 0 octets. A 20/40 BSS Intolerant Channel Report, according to TGn Draft 3.0, shall only report channels for a single regulatory class and for channels that are valid for the regulatory. Multiple 20/40 BSS Intolerant Channel Report elements may be used to report channels in more than one regulatory class. The Channel List may contain a variable number of octets, where each octet may describe a single channel number. FIG. 5B is a diagram illustrating the format of a 20/40 BSS Intolerant Channel Report element 11 which has all of the fields of the 20/40 BSS Intolerant Channel Report element 9 but additionally contains the Scanning Exempt Request Field 7 which contains one octet where the octet specifies if the STA 10 is requesting exemption from scanning or not. The Channel List of the 20/40 BSS Intolerant Channel Report element 11 may be capable of containing a list of channels on which a STA has found conditions that disallow the use of a 20/40 MHz BSS.

Referring now to FIG. 6A, a signaling diagram according to the TGn Draft 3.0 standard is provided. As shown, in FIG. 6A, at signaling operation 600, a STA 10 may be capable of sending a 20/40 BSS Intolerant Channel Report element 9 to an AP (e.g., AP 63) and at signaling operation, 605, the AP (AP 63) may be capable of sending an acknowledgment (ACK) back to the STA 10 indicating that the 20/40 BSS Intolerant Channel Report element 9 was received. Turning to FIG. 6B, a signaling diagram relating to the sending of a 20/40 BSS Intolerant Channel Report element 11 with a Request for scanning exemption 7 sent from a STA(s) to an AP such as AP 64 according to exemplary embodiments is illustrated. At signaling operation 650, the STA 10 may send the 20/40 BSS Intolerant Channel Report element 11 with Request for scanning exemption 3 flag set to the AP such as AP 64. At signaling operation 655, the AP such as AP 64 may send the STA 10 an acknowledgement (ACK) that the 20/40 BSS Intolerant Channel Report element 11 with Request for scanning exemption 3 flag set (e.g., a bit set to value 1) was received. At signaling operation 660, the AP such as for example, AP 64 may send a signal indicating whether the STA 10 is allowed to be exempt for scanning or not in a "Scanning Exempt Response frame" 15. (See FIG. 7 and discussion below) At signaling operation 665, the STA 10 may send an acknowledgement (ACK) to the AP (e.g. AP 64) indicating that it received the Scanning Exempt Response frame 15.

Referring now to FIG. 7, a block diagram is provided of a Scanning Exempt Response frame that is sent from an AP to one or more STAs according to an exemplary embodiment. As shown in FIG. 7, the Scanning Exempt Response frame 8 may include an Element ID Field, a Length Field, a Regulatory Class Field and a Scanning Exempt Response Field. The Length field of this embodiment is variable, and depends on the number of channels reported in the Channel List. The minimum value of the length field is 1 (based on a minimum length for the channel list field of 0 octets). The Scanning Exempt Response Frame 8 typically relates to channels for a single regulatory class and for channels that are valid for the regulatory. Multiple Scanning Exempt Response Frames may be used to report data relating to channels in more than one regulatory class. In this exemplary embodiment, the regulatory class field may consist of one octet. If an AP such as AP 64 determines that a respective STA 10 is allowed to be exempt from scanning, the Scanning Exempt Response Field may include a bit set to a value of "1". On the other hand, if the AP such as AP 64 determines that a respective STA 10 is not allowed to be exempt from scanning the Scanning Exempt Response Field may include a bit set to a value of "0".

Referring now to FIG. 8, a flowchart relating to one or more rules for setting the Response to Scanning Exemption Field 5 of the Scanning Exempt Response Frame 8 is provided. In this manner, there may be one or more rules at the AP, for example AP 64, (or any other suitable AP of the system of FIG. 2) which are executed by the processor of the AP 64. For example, at operation 800 one or more rules may be defined and stored in a memory (not shown) of the AP 64 relating to setting the Response to Scanning Exemption Field 5 of the Scanning Exempt Response Frame 8. At operation 805, rules may be established and stored in the memory of AP 64 specifying that if the request for scanning exemption 3 of the Scanning Exempt Request Field 7 (which is within the 20/40 BSS Intolerant Channel Report element 11) is sent from a STA 10 which is the only STA 10 that has signaled the un-availability of a specific channel for 20/40 MHz use, then the Response to Scanning Exemption Field 5 of the Scanning Exempt Response Frame 8 sent to the STA is set to "0" indicating that the STA is not exempt from scanning. As noted above, STAs of one embodiment may signal the unavailability of a channel(s) in the 20/40 BSS Intolerant Channel Report element 11. On the other hand, at operation 810, if the processor of AP 64 determines that there are multiple STAs 10 that have indicated that a respective channel(s) is not usable then if all the STAs that have indicated that a specific channel is not usable for 20/40 MHz operation have all requested for "Exemption from Scanning" then the processor of the AP 64 may select or pick at least one of the STAs from the STAs that have indicated unavailability on a specific channel to continue scanning by setting the Response to Scanning Exemption field to "0" and enable all other STAs to be allowed to be exempt from scanning by setting the Response to Scanning Exemption field to "1" for example.

The processor of the AP 64 may select or pick a STA 10 that has indicated the unavailability of the maximum number of channels (amongst the STAs that have indicated unavailability of the channel). For instance, consider the scenario of 3 STAs 10 (i.e., STA 1, STA 2 and STA 3). Consider that STA 1 has indicated unavailability of Channels 1, 4 and 5 and STA 2 has indicated unavailability of Channels 1 and 4 On the other hand, STA 3 has indicated unavailability of channels 1 and 5. In this regard, the processor of AP 64 will pick or select STA 1 since STA 1 shows unavailability of a maximum number of channels (e.g., three in this example).

It should be pointed out that STAs can be picked on a round robin basis to allow STAs to conserve power. For example, if at a specific point of time, STA 1 and STA 2 have requested a scanning exemption and they have indicated at least one channel that is common to both of them because of which the AP is not recommended to switch to 40 MHz operation, then if the AP has allowed STA 1 to be exempt from scanning at an earlier point of time if there are similar reports available from both STA 1 (e.g., STA 1 had to send the report because of exceeding activity threshold) and STA 2 then the AP can possibly pick STA 2 to be allowed to be exempt from scanning, thereby alternating between STA_1 and STA_2. At operation 815, if the processor of the AP determines that from the STAs 10 that have indicated un-availability of a specific channel, there is at least one STA 10 that has not requested for exemption from scanning, then all the STAs 10 that have requested exemption from scanning can be allowed to do so and will be sent a Scanning Exempt Response Frame 8 indicating allowance of exemption from scanning in the Response to Scanning Exemption field. At operation 820, if the processor of the AP 64 determines that there are multiple channels for which a STA 10 has indicated un-availability of 20/40 MHz operation, then the AP 64 may repeat operations 800 to 820 for each of the channels even if there is one channel in which a STA 10 cannot be granted to be exempt from scanning. In this regard, the AP 64 may disallow the STA 10 to be exempt from scanning. It should be pointed out that the multiple channels for which a STA(s) indicates unavailability of a 20/40 MHz operation may be included in a 20/40 BSS Intolerant Channel Report element 11. For instance, this information may be in the Channel List field.

In an alternative embodiment, the AP 64 in its beacon can announce that it does not provide any exemptions to STAs from scanning (e.g., all 40 MHz STAs 10 are required to scan) by setting a field in its beacon or by setting the ACTIVITY_THRESHOLD field in a beacon to zero. This can help STAs at the time of association determine if they want to associate with a particular AP or not. In order for the STA to associate with an AP, the STA may transmit an associate frame to the AP to which the AP responds back. If the AP is willing to include the STA to be part of its BSS, then the response from the AP may include the identification (ID) by which the STA will be addressed by the AP.

It should be understood that each block or step of the flowcharts, shown in FIG. 8 and combination of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device, such as a memory device, of the mobile terminal, and executed by a processor, such as the processor of the mobile terminal. As will be appreciated, any such computer program instructions may be loaded onto a computer or other programmable apparatus (e.g., hardware) to produce a machine, such that the instructions which execute on the computer or other programmable apparatus (e.g., hardware) means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the functions specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions that are carried out in the system.

The above described functions may be carried out in many ways. For example, any suitable means for carrying out each of the functions described above may be employed to carry out the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising: receiving one or more requests to be exempt from scanning one or more channels to identify one or more devices in a basic service set (BSS) operating in the one or more channels;
   determining if at least one of the one or more requests is received from at least one device which has indicated that at least one of the channels is unavailable for use; and
   when at least one of the one or more requests is determined to have been received from at least one device which has indicated that the at least one channel is unavailable, determining to disallow the at least one device exemption from performing the scanning in order to maintain visibility of the at least one channel.

2. The method of claim 1, wherein the one or more channels are at least one of the 20 megahertz (MHz) channels and 40 megahertz (MHz) channels.

3. The method of claim 1, further comprising:
   determining if a plurality of the one or more devices request exemption from scanning on the basis of information in the requests;
   determining if the plurality of one or more devices indicate that at least one of the channels is unavailable for use and when the determination reveals that the at least one channel is unavailable, selecting at least one of the plurality of devices to perform the scanning; and
   allowing each of the other plurality of devices exemption from performing the scanning.

4. The method of claim 1, further comprising:
   identifying the one or more devices that indicate unavailability of at least one channel in the requests; and
   identifying which of the one or more devices requests exemption from the scanning and when there is at least a first device of the devices that does not request exemption from the scanning, allowing each of the devices which requested exemption to be exempt from performing the scanning.

5. The method of claim 1, wherein the one or more requests comprises a plurality of fields, wherein at least one of the fields comprises information specifying whether a respective one of the devices requests exemption from performing the scanning and another field comprises information specifying the availability and unavailability of using at least one of the one or more channels in the BSS.

6. The method of claim 1, further comprising disallowing at least another device exemption from scanning even though the another device is configured to operate on a respective one of the channels in a bandwidth of substantially 40 megahertz (MHz) and traffic on the respective channel is below a predetermined threshold.

7. The method of claim 1, wherein scanning further comprises obtaining data indicating whether at least a first device of the devices uses a respective one of the channels and identifying whether the first device is configured to operate in one or more bandwidths of the respective channel.

8. An apparatus, comprising:
at least one processor; and
at least one memory including computer program code, the at least one memory and the computer program code configured to, with the at least one processor, cause the apparatus to perform at least the following:
receive one or more requests to be exempt from scanning one or more channels to identify one or more devices in a basic service set (BSS) operating in the one or more channels;
determine if at least one of the one or more requests is received from at least one device which has indicated that at least one of the channels is unavailable for use; and,
when at least one of the one or more requests is determined to have been received from at least one device which has indicated that the at least one channel is unavailable, determine to disallow the at least one device exemption from performing the scanning in order to maintain visibility of the at least one channel.

9. The apparatus of claim 8, wherein the one or more channels are at least one of the 20 megahertz (MHz) channels and 40 megahertz (MHz) channels.

10. The apparatus of claim 8, wherein the at least one memory and the computer program code are configured to, with the at least one processor, cause the apparatus to further perform:
determine if a plurality of the one or more devices request exemption from scanning on the basis of information in the requests;
determine if the plurality of the one or more devices indicate that at least one of the channels is unavailable for use and when the determination reveals that the at least one channel is unavailable, selecting at least one of the plurality of devices to perform the scanning; and
allow each of the other plurality of devices exemption from performing the scanning.

11. The apparatus of claim 8, wherein the at least one memory and the computer program code are configured to, with the at least one processor, cause the apparatus to further perform:
identify the one or more devices that indicate unavailability of at least one channel in the requests; and
identify which of the one or more devices requests exemption from the scanning and when there is at least a first device of the devices that does not request exemption from the scanning, allowing each of the devices which requested exemption to be exempt from performing the scanning.

12. The apparatus of claim 8, wherein the one or more requests comprises a plurality of fields, wherein at least one of the fields comprises information specifying whether a respective one of the devices requests exemption from performing the scanning and another field comprises information specifying the availability and unavailability of using at least one of the one or more channels in the BSS.

13. The apparatus of claim 8, wherein the at least one memory and the computer program code are configured to, with the at least one processor, cause the apparatus to further perform:
disallow at least another device exemption from scanning even though the another device is configured to operate on a respective one of the channels in a bandwidth of substantially 40 megahertz (MHz) and traffic on the respective channel is below a predetermined threshold.

14. The apparatus of claim 8, wherein scanning further comprises obtaining data indicating whether at least a first device of the devices uses a respective one of the channels and identifying whether the first device is configured to operate in one or more bandwidths of the respective channel.

15. A computer program product comprising a non-transitory computer-readable medium bearing computer program code embodied therein for use with a computer, the computer program code comprising:
code for receiving one or more requests to be exempt from scanning one or more channels to identify one or more devices in a basic service set (BSS) operating in the one or more channels;
code for determining if at least one of the one or more requests is received from at least one device which has indicated that at least one of the channels is unavailable for use; and,
code for determining, when at least one of the one or more requests is determined to have been received from at least one device which has indicated that the at least one channel is unavailable, to disallow the at least one device exemption from performing the scanning in order to maintain visibility of the at least one channel.

16. The computer program product of claim 15, wherein the one or more channels are at least one of the 20 megahertz (MHz) channels and 40 megahertz (MHz) channels.

17. The computer program product of claim 15, further comprising:
code for determining if a plurality of the one or more devices request exemption from scanning on the basis of information in the requests;
code for determining if the plurality of the one or more devices indicate that at least one of the channels is unavailable for use and if the determination reveals that the at least one channel is unavailable, selecting at least one of the plurality of devices to perform the scanning; and
code for allowing each of the other plurality of devices exemption from performing the scanning.

18. The computer program product of claim 15, further comprising:
code for identifying the one or more devices that indicate unavailability of at least one channel in the requests; and
code for identifying which of the one or more devices requests exemption from the scanning and when there is at least a first device of the devices that does not request exemption from the scanning, allowing each of the devices which requested exemption to be exempt from performing the scanning.

19. The computer program product of claim 18, further comprising:
code for disallowing at least another device exemption from scanning even though the another device is configured to operate on a respective one of the channels in a bandwidth of substantially 40 megahertz (MHz) and traffic on the respective channel is below a predetermined threshold.

20. The computer program product of claim 15, wherein the one or more requests comprises a plurality of fields, wherein at least one of the fields comprises information specifying whether a respective one of the devices requests exemption from performing the scanning and another field comprises information specifying the availability and unavailability of using at least one of the one or more channels in the BSS.

* * * * *